Sept. 2, 1952 W. E. MONTGOMERY 2,608,728
PACKING AND METHOD OF APPLICATION
Filed Jan. 5, 1949
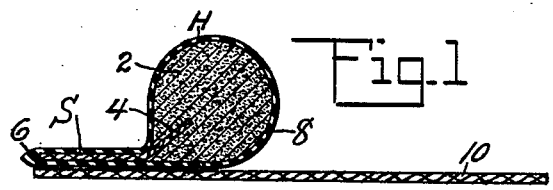
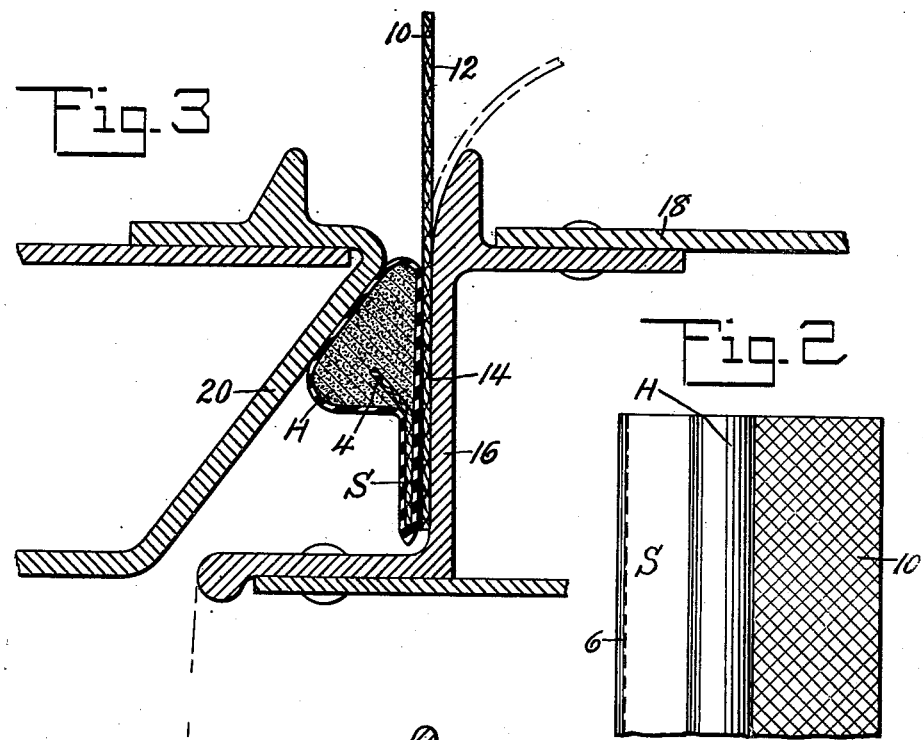
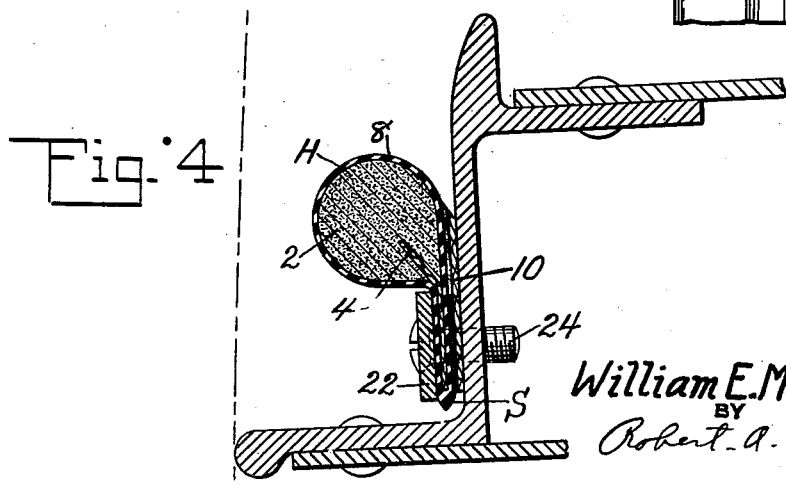
INVENTOR
William E. Montgomery
BY
Robert A. Shield
ATTORNEY Patented Sept. 2, 1952

2,608,728

UNITED STATES PATENT OFFICE 2,608,728

PACKING AND METHOD OF APPLICATION

William E. Montgomery, Wilmington, Del., assignor to American Car and Foundry Company, New York, N. Y., a corporation of New Jersey Application January 5, 1949, Serial No. 69,283

4 Claims. (Cl. 20—69)

This invention relates to packing in general and particularly to packing which is inserted in joints between relatively movable members of irregular contour.

Normally, the joint between movable members is made as close fitting as possible so that the packing may be quite accurately positioned and secured to one of the members. However, in doors and windows or other members having irregular contour, such as the curving doors of aeroplanes or modern streamlined trains, it is impossible to accurately position the parts and control the clearances between the parts. Accordingly, it has been impossible to accurately position the packing and have equal compression to provide an efficient seal throughout the joint. It is an object, therefore, of the present invention to provide a packing which may be accurately positioned in the joint between two relatively movable members.

A further object of the invention is the provision of a packing member having a positioning member secured thereto and by means of which the packing may be pulled into the joint between two relatively movable members.

A still further object of the invention is the provision of a method for securing packing in the joint between two relatively movable members.

These and other objects of the invention will be apparent to persons skilled in the art from a study of the following description and accompanying drawings, in which:

Fig. 1 is a cross-sectional view taken through the improved packing and positioning member;

Fig. 2 is an elevational view of a portion of the packing and positioning member;

Fig. 3 is a sectional view showing the improved packing and a positioning member during application to a joint between a door and its jamb, and Fig. 4 is a cross-sectional view showing the packing as finally applied to the door.

Referring now to the drawings in detail, it will be seen that the packing is made up of a cylindrical portion 2 preferably made of a springy material of the proper resiliency. For example, this may be made of sponge rubber of either natural or synthetic type. A metallized fabric member of angular shape has one portion 4 embedded within the cylindrical portion and extending radially to merge into a tangentially extending stem portion 6. This metallized fabric is preferably of a canvas type having spring wire loops embedded therein and of sufficient stiffness as to hold the cylindrical portion in proper angular relationship to the stem. A covering 8 of impervious material totally encases the cylindrical portion and the metallized stem portion, thus forming a self-sustained packing member having a b-shaped cross-section. In other words, the covering is of half note or minim shape and has placed therein the resilient material of the head and the metallized stem. The covering is preferably made of a tough wear resisting synthetic impervious to water and oil and retaining its resilience over wide temperature ranges.

To the back side of the stem S of the completed packing is secured a positioning member 10, which positioning member extends along the stem and past the head H of the completed packing, all as clearly shown in Fig. 1. This positioning member may be formed of any material which does not readily stretch, such as a canvas or a similar fabric. After the positioning member has been secured to the back side of the packing it preferably has an adhesive applied to the surface 12 and this surface is then placed in contact with the surface 14 of the door frame member 16, which frame member surrounds the entire edge of the door panels 18. The adhesive is preferably of the slow drying or rubber type which will hold the positioning member onto the door frame yet permit its movement relative thereto under sufficient pressure. After the positioning member has been temporarily secured to the door frame, the door will be moved to its final closed position in which a gap is of necessity provided between the frame and the door jamb 20. With the door in its final closed position, the positioning member is firmly gripped and pulled to slide the member with respect to the door frame and thus pull the packing tightly into engagement with the door and door jamb. Through the application of predetermined pressure the packing may be deformed as shown in Fig. 3 equally around the entire door and within limits irrespective of the gap between the door and door jamb. After the positioning member has been used to pull the packing into the position of Fig. 3, then it may be bent to the line and dash position in which the added adhesive surface will serve to hold the packing in position. If desired a smaller amount of adhesive may be used and the projecting positioning member clamped onto the door after it has been used to pull the packing into proper position. With the packing pulled into proper position and held there, either by adhesive or clamping means, the door may be opened and the packing stem securely fastened to the door jamb by any suitable means, such as strip 22 and fasteners 24 extending through the strip, packing stem and into the door frame. Following the permanent attachment of the packing to the door frame, the excess or extended portion of the positioning member may be trimmed off leaving the packing in the condition as shown in Fig. 4.

It will, of course, be obvious that the improved packing and method of application may be used with windows or any other relatively movable members which can not accurately be positioned relative to each other. It will further be obvious that the packing may be applied and permanently attached to other movable members, for example it may be attached to the door jamb instead of to the door frame as shown and described. Also, while the invention has been described in detail and with particular reference to the drawings, it will be obvious that various modifications and rearrangements of parts may be made without departing from the scope of the invention as defined by the following claims.

What is claimed is:

1. The method of applying a packing to the joint between two relatively movable members such as a door and its jamb, which consists in securing a positioning member to a resilient packing, applying adhesive to the positioning member, temporarily securing the positioning member to one of the relatively movable members, placing the movable members in final position relative to each other with the positioning member projecting from the joint, pulling on the positioning member to move the packing into tight engagement with the relatively movable member, separating the relatively movable members and permanently securing the packing to the member on which it was temporarily secured.

2. The method of applying a packing to the joint between a door and its jamb, which consists in providing an assembly of a packing with an extending positioning member, placing the assembly in the joint between the open door and its jamb, moving the door to its closed position with the positioning member extending from the joint, pulling on the positioning member to move the packing into tight engagement with the door and jamb, temporarily securing the positioning member on the door, opening the door and permanently securing the packing to the door.

3. The method of claim 2 including the added step of removing the projecting portion of the securing member following the permanent securing of the packing to the door.

4. The method of applying a packing to the joint between a door and its jamb, which consists in providing an assembly of a packing with an extending positioning member, placing the assembly in the joint between the open door and its jamb, moving the door to its closed position with the positioning member extending from the joint, pulling on the positioning member to move the packing into tight engagement with the door and jamb, temporarily securing the positioning member on the jamb, opening the door and permanently securing the packing to the jamb.

WILLIAM E. MONTGOMERY.

REFERENCES CITED

The following references are of record in the file of this patent:

UNITED STATES PATENTS

| Number | Name | Date |
| --- | --- | --- |
| 1,533,490 | Wirfs | Apr. 14, 1925 |
| 1,893,399 | Clark | Jan. 3, 1933 |
| 2,232,570 | Spraragen | Feb. 18, 1941 |